(12) United States Patent
Johnson et al.

(10) Patent No.: US 10,760,568 B2
(45) Date of Patent: Sep. 1, 2020

(54) MULTI-PART VALVE ASSEMBLY

(71) Applicant: ValveWorks, LLC, Dallas, TX (US)

(72) Inventors: Daniel E. Johnson, Double Oak, TX (US); Edward P. Cox, Cumby, TX (US); Starr L. Pitzer, Jr., Dallas, TX (US)

(73) Assignee: ValveWorks, LLC, Dallas, TX (US)

( * ) Notice: Subject to any disclaimer, the term of this patent is extended or adjusted under 35 U.S.C. 154(b) by 0 days.

(21) Appl. No.: 15/676,624

(22) Filed: Aug. 14, 2017

(65) Prior Publication Data

US 2017/0356440 A1 Dec. 14, 2017

Related U.S. Application Data

(63) Continuation-in-part of application No. 15/296,993, filed on Oct. 18, 2016, now abandoned, which is a continuation of application No. 14/213,696, filed on Mar. 14, 2014, now Pat. No. 9,470,226.

(60) Provisional application No. 61/785,246, filed on Mar. 14, 2013.

(51) Int. Cl.
| | |
|---|---|
| *F16K 15/06* | (2006.01) |
| *F04B 53/10* | (2006.01) |
| *F16K 1/36* | (2006.01) |
| *F16K 25/00* | (2006.01) |

(52) U.S. Cl.
CPC ........ *F04B 53/108* (2013.01); *F04B 53/1027* (2013.01); *F16K 1/36* (2013.01); *F16K 15/06* (2013.01); *F16K 25/005* (2013.01)

(58) Field of Classification Search
CPC ........ F16K 15/023; F16K 15/028; F16K 1/34; F16K 1/36; F16K 1/38; F16K 15/06; F16K 51/00; F16K 1/48; F16K 1/182; F16K 1/485; F16K 1/487; F04B 53/1027; F04B 53/1022
See application file for complete search history.

(56) References Cited

U.S. PATENT DOCUMENTS

| | | | |
|---|---|---|---|
| 1,721,114 A | 7/1929 | Hampton et al. | |
| 1,861,420 A | 5/1932 | Mahan | |
| 2,093,662 A | 9/1937 | Steirly | |
| 2,483,572 A | 10/1949 | Cater | |

(Continued)

FOREIGN PATENT DOCUMENTS

| | | |
|---|---|---|
| EP | 0 823 577 A2 | 2/1998 |
| GB | 0401667 A | 11/1933 |

(Continued)

*Primary Examiner* — Marina A Tietjen
(74) *Attorney, Agent, or Firm* — John G. Fischer, Esq.; Scheef & Stone, L.L.P.

(57) ABSTRACT

The present disclosure discloses a multi-component valve system for use in pumps such as fracking pumps for use in subterranean resource production. The assembly includes a retaining pin having a retaining cap on its upper end. Located on the retaining pin are an insert retainer, an insert beneath the insert retainer, a valve beneath the insert, and a guide beneath the valve. The guide has a generally truncated pyramid shape, and a central portion on its upper end. The central portion is centered on the retaining pin. The retaining pin has an expanded lower end to secure the valve assembly together.

19 Claims, 15 Drawing Sheets

(56) References Cited

U.S. PATENT DOCUMENTS

| | | | |
|---|---|---|---|
| 2,745,631 A * | 5/1956 | Shellman | F04B 53/1027 |
| | | | 137/543.23 |
| 2,792,016 A | 5/1957 | Shellman et al. | |
| 2,898,082 A | 8/1959 | Von Almen et al. | |
| 2,903,235 A | 9/1959 | Rodgers et al. | |
| 3,057,372 A | 10/1962 | Sutton et al. | |
| 3,063,467 A | 11/1962 | Roberts, Jr. et al. | |
| 3,070,120 A | 12/1962 | Wendt | |
| 3,092,139 A | 6/1963 | Rodgers et al. | |
| 3,154,096 A * | 10/1964 | Bell | F02M 63/00 |
| | | | 137/523 |
| 3,202,178 A | 8/1965 | Wolfe | |
| 3,324,880 A | 6/1967 | Roberts et al. | |
| 3,409,039 A | 11/1968 | Griffin | |
| 3,483,885 A * | 12/1969 | Leathers | F16K 15/02 |
| | | | 137/329.02 |
| 3,869,956 A * | 3/1975 | Breer | F16B 19/04 |
| | | | 411/506 |
| 4,076,212 A | 2/1978 | Leman | |
| 4,180,097 A | 12/1979 | Sjoberg | |
| 4,518,329 A | 5/1985 | Weaver | |
| 4,545,404 A | 10/1985 | Redwine | |
| 4,860,995 A | 8/1989 | Rogers | |
| 5,030,413 A | 7/1991 | Knierriem et al. | |
| 5,088,521 A | 2/1992 | Johnson | |
| 5,193,577 A | 3/1993 | de Koning | |
| 5,275,204 A | 1/1994 | Rogers et al. | |
| 5,687,792 A | 11/1997 | Rodger et al. | |
| 6,808,157 B1 | 10/2004 | Mudge et al. | |
| 7,159,731 B2 | 1/2007 | Kai | |
| 7,641,175 B1 | 1/2010 | Blume | |
| 7,721,753 B2 | 5/2010 | Wears | |
| 2006/0202150 A1 | 9/2006 | Johnson | |
| 2007/0246673 A1 | 10/2007 | Bircann | |
| 2011/0180163 A1 | 7/2011 | Jakubowski | |
| 2012/0074687 A1 | 3/2012 | Mitchell | |
| 2014/0264133 A1 | 9/2014 | Johnson et al. | |

FOREIGN PATENT DOCUMENTS

| | | |
|---|---|---|
| GB | 1300086 A | 12/1972 |
| GB | 1483317 A | 8/1977 |

* cited by examiner

MULTI-PART VALVE ASSEMBLY

RELATED APPLICATIONS

This application is a continuation-in-part of co-pending U.S. application Ser. No. 15/296,993 filed Oct. 18, 2016, which is a continuation of U.S. application Ser. No. 14/213,696 filed Mar. 14, 2014, now U.S. Pat. No. 9,470,226 issued Oct. 18, 2016, which claimed the benefit of U.S. Provisional Application No. 61/785,246 filed Mar. 14, 2013, the disclosures of which are hereby incorporated herein by reference in their entirety.

TECHNICAL FIELD

The disclosed design relates to a valve assembly for use in reciprocating, positive displacement pumps, such as mud pumps, well service pumps, and other industrial applications. More particularly, the disclosed design is especially suitable for use in a fracking pump for subterranean production services. More specifically, the presently disclosed design relates to a multi-part valve assembly of various materials constructed in a novel manner that replaces conventional two and three part welded valves.

BACKGROUND

Valves have been the subject of engineering design efforts for many years, and millions of them have been used. The engineering development of valves has stagnated in this crowded and mature field of technology. Improvements have been elusive in recent years, even as the cost of materials and manufacturing has continued to climb.

The basic valve structure is present in several U.S. patent publications. Some of these describe conventional methods of building a valve, and others describe methods that have been rejected by industry. Fewer disclosures teach multiple component valves, as valves having multiple components have heretofore been disfavored for a number of reasons. Primarily, they are viewed as more costly to manufacture. Multiple components require multiple manufacturing steps, assembly steps, and fit-tolerances requirements that valves having fewer parts do not have. Secondly, each assembly and connection is deemed a potential failure point, so these valves are, again, disfavored.

Fracking valves are a particular valve used to pump hard material into a production wellbore for the purpose of fracturing the reservoir containing formations to increase fluid flow into the wellbore. Such pumps are reciprocating, positive displacement pumps in which the valves are held closed by springs and open and close by differential pressure. The pumps deliver clear fluids or slurries through simple poppet valves that are activated (opened and closed) by the fluid pressure differential generated when the mechanical energy of the pump is converted into fluid pressure.

In oil and gas exploration, there are two common reciprocating, positive displacement applications; mud pumps and well service pumps. The disclosed design is also appropriate in both of these categories as well as other, general industrial reciprocating, positive displacement applications. Pump valves in these applications must be guided as they move back and forth about an axis parallel to the fluid flow. The guides may be "stems" or "wings" and these may be on either side or both sides of the valve. They must remain an inseparable part of the pump valve during its useful life.

Due to the hardness of the material being pumped, valves include a soft seating material, such as a urethane insert, such that a seal can be obtained. The softer insert component necessitates at least some assembly in frack valves. Other than the inclusion of the insert, conventional manufacturing practice has been to minimize the number of components in a valve assembly.

Conventional pump valves are thus made from a pair of near net shape pieces of low carbon alloy steel that are welded together and then carburized to produce a hard, wear resistant surface. The process of manufacturing such near net shapes is expensive. Alternatively, pump valves are made from high carbon, low alloy steels of one expensive piece that requires detailed finishing, as these alloys are generally not welded.

One form of convention valve manufacturing includes making the components of the valve of high alloy steel such as 8620 or 4130. These are expensive grades of steel for manufacturing a limited life product. Additionally, conventional manufacturing techniques generate material waste.

Conventional valve guides are manufactured by investment casting. It is common practice to forge a one-piece valve and top stem of low carbon alloy steel. The two pieces are welded together and carburized as a single piece.

An alternative known method of making valves is to make a single investment casting of the entire valve for assembly with only the insert. As with the other method, the entire part is then carburized to harden it.

An alternative known method of making valves is to make a single piece forging from a high carbon alloy steel. Areas that require hardened surfaces are induction or flame hardened. However, the only areas of the valve that require hardened surfaces are relatively small and include the face of the valve and the outer edges of the guides.

The disclosed design replaces expensive raw material forms with a combination of inexpensive pieces and allows the most productive selective hardening processes to be used.

SUMMARY

The disclosed design provides a pump valve and a method of manufacturing and assembling the pump valve that allows the use of materials usually considered unsuitable for multiple components welded together to be constructed as a weldment.

This disclosed design provides for the use of high carbon or high carbon alloy steel that can be induction or flame hardened and a collection of inexpensive pieces to be assembled and captured as a finished unit at the time of welding. The weld can be a solid state inertia or friction weld or any appropriate melt fusion technique. The assembly includes a retaining pin, a guide, a valve, an insert, a retainer, and a retainer cap. The retainer cap is welded to an end of the retaining pin to compress the other elements into an assembly.

One embodiment of the disclosed design provides for the assembly of several components of simpler geometry that would not generally be considered candidates for welding because of their composition.

In another embodiment, a valve assembly is provided comprising a retaining pin, a wing guide located on the retaining pin, and a valve located on the retaining pin above the guide. An insert is located on the valve. An insert retainer is located on the retaining pin above the insert. A retainer cap is welded to the retaining pin to hold the collective assembly together.

In another embodiment, the top stem, retainer, wing guide stem, and wing guide are comprised of a low carbon, or low alloy steel material, and the valve is comprised of steel higher in carbon content than that of the retaining pin, guide, and retainer.

In another embodiment, the weld between the retainer cap and the retaining pin is an inertia weld.

In another embodiment, the retainer cap has a nonagon configuration.

In another embodiment, the guide has a top portion and three legs extending downward from the top portion. A footer extends outward from each leg. Three stabilizers extend downward from the top portion, one each between the downwardly extending legs.

In another embodiment, a plurality of tabs extends outward from the top portion. The tabs engage the internal circumference of a circular recess in the valve to center the guide concentrically with the valve.

In another embodiment, the retaining pin has a generally triangular head for fitted engagement with the underside of the guide.

An advantage of the above summarized invention is that many of the parts may be made of material that is easy to machine, such that these components can be made less expensively.

Another advantage is that many of the components need not be heat treated, eliminating a costly process step that is applied to the entirety of conventional valve assemblies.

Another advantage is that it is unnecessary to selectively and manually apply and remove expensive compounds needed to prevent carburization of several surfaces to which hardening is undesirable.

More recently, an improvement to the above disclosed design has been developed, for which this summary continues.

In the more recent, present embodiments, an improved valve assembly is provided. The assembly includes a retaining pin having a retaining cap on its upper end. Located on the retaining pin are an insert retainer, an insert beneath the insert retainer, a valve beneath the insert, and a guide beneath the valve. The guide has a generally truncated pyramid shape, and a central portion on its upper end. The central portion is centered on the retaining pin. The retaining pin has an expanded lower end to secure the valve assembly together.

In another embodiment, the guide is bell-shaped. In the guide, four legs are interconnected by a generally square base. In another embodiment, the guide has a window opening on each of the four sides.

In another embodiment, the guide has a substantially circular top, and has a conical upper portion extending downward from the top. There is a continuous base, with four legs connecting the upper portion to the base. In this embodiment and others, the guide has eight perimeter extents along the base.

In another embodiment, a washer is located between the retaining pin and the central portion of the guide. The retainer pin end may be formed by hot pressing the pin.

Advantages and features of the embodiments presently disclosed will become more readily understood from the following detailed description and appended claims when read in conjunction with the accompanying drawings in which like numerals represent like elements.

The drawings constitute a part of this specification and include exemplary embodiments to the disclosed design, which may be embodied in various forms. It is to be understood that in some instances various aspects of the disclosed design may be shown exaggerated or enlarged to facilitate an understanding of the disclosed design.

DETAILED DESCRIPTION

The following description is presented to enable any person skilled in the art to make and use the disclosed design, and is provided in the context of a particular application and its requirements. Various modifications to the disclosed embodiments will be readily apparent to those skilled in the art, and the general principles defined herein may be applied to other embodiments and applications without departing from the spirit and scope of the disclosed design. Thus, the disclosed design is not intended to be limited to the embodiments shown, but is to be accorded the widest scope consistent with the principles and features disclosed herein.

Figure 1:
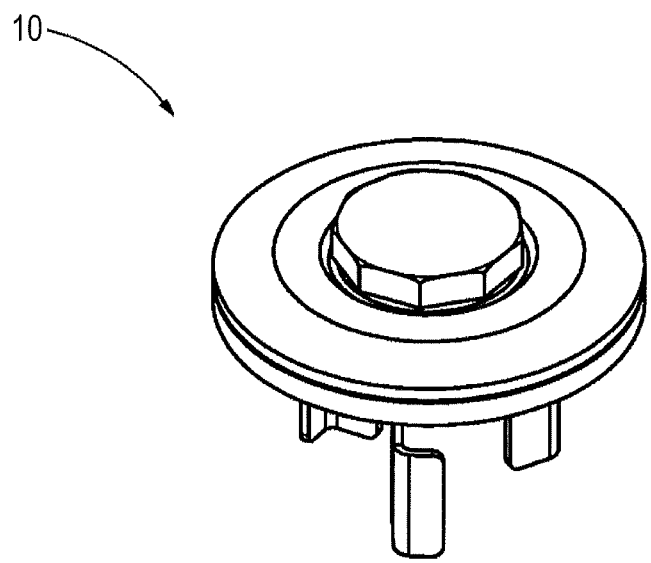
FIG. 1 is an isometric view of the valve assembly shown in accordance with certain embodiments of the present invention, as viewed from the top of the valve.
Figure 2:
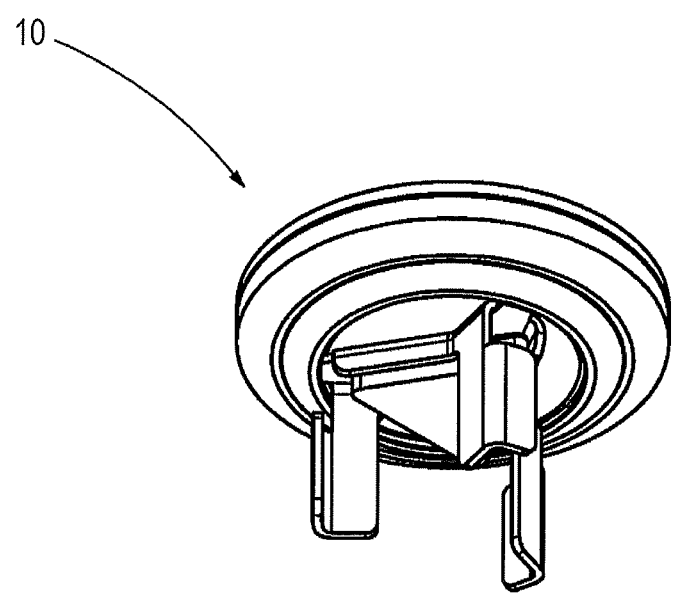
FIG. 2 is an isometric view of the valve assembly of FIG. 1 as viewed from the bottom of the valve.

FIG. 1 is an isometric view of an embodiment of a valve assembly 10 as viewed generally from the top of valve assembly 10. FIG. 2 is an isometric view of this embodiment of valve assembly 10 as viewed generally from the bottom of valve assembly 10.

Figure 3:
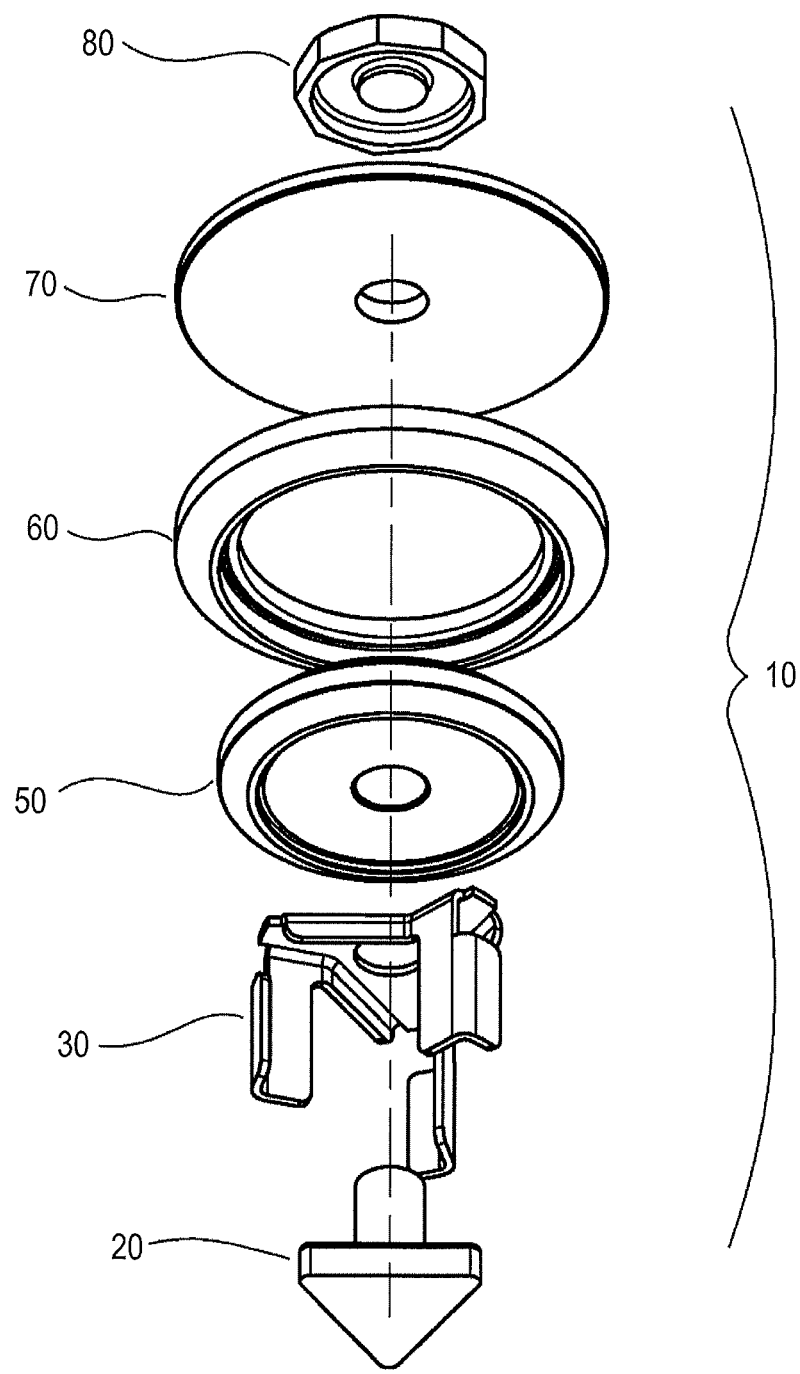
FIG. 3 is an isometric exploded view of the valve assembly of FIGS. 1-2 shown in accordance with certain embodiments of the present invention.

FIG. 3 is an isometric exploded view of an embodiment of valve assembly 10, illustrating the multiple components of this embodiment. Valve assembly 10 comprises a retaining pin 20. A guide 30 is positioned on retaining pin 20. A valve 50 is positioned on retaining pin 20 above guide 30. An insert 60 is positioned on and in engagement with valve 50. A retainer 70 is positioned on retaining pin 20 above and engaging insert 60 and valve 50. A retainer cap 80 is welded to retaining pin 20 and optionally to retainer 70.

Figure 4:
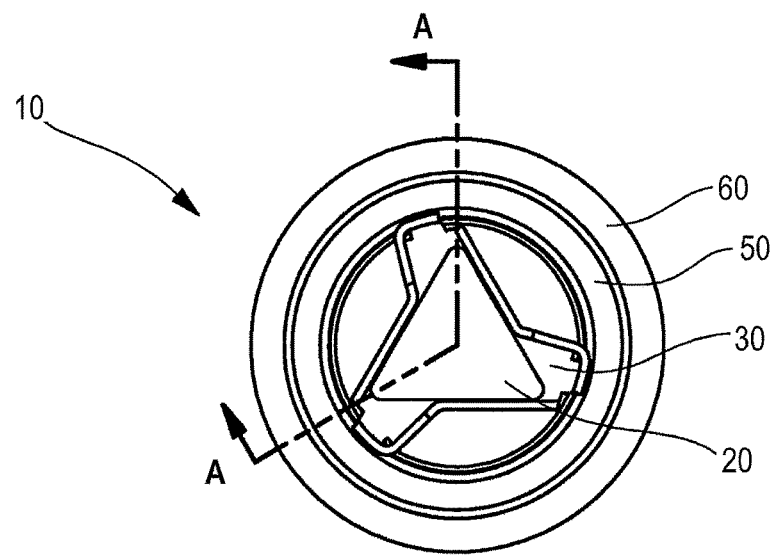
FIG. 4 is a bottom view of the valve assembly embodiment of FIGS. 1-3, illustrating a section line A-A through this view of the valve assembly.

FIG. 4 is a bottom view of the embodiment of valve assembly 10 illustrated in FIGS. 1-3, and providing a section line A-A through this view of valve assembly 10.

Figure 5:
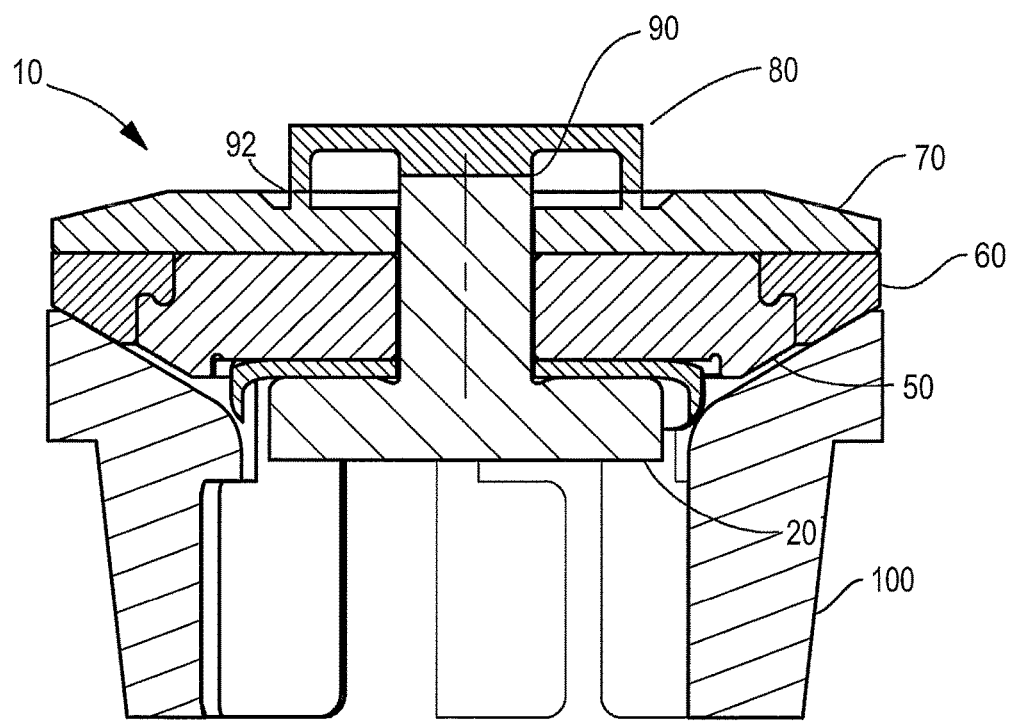
FIG. 5 is a sectional view of the valve assembly embodiment of FIGS. 1-4 sectioned at A-A as illustrated in FIG. 4.

FIG. 5 is a sectional view of the valve assembly embodiment of FIGS. 1-4 sectioned at A-A as illustrated in FIG. 4. Valve assembly 10 is illustrated at a valve seat and extending into a valve port 100. As shown, guide 30 centers valve assembly 10 inside valve port 100. Valve 50 engages a valve seat portion above valve port 100 in normal operation, as does insert 60. Retainer 70 compresses insert 60, valve 50, and guide 30 between retaining pin 20 and retainer cap 80. Retainer cap 80 is welded at 90 to retaining pin 20 to form a secure valve assembly 10 in which the component parts do not rotate relative to each other. In an optional embodiment illustrated, retainer cap 80 is also welded at 92 to retainer 70. In a preferred embodiment, retainer cap 80 is friction, or inertia welded at 90 to retaining pin 20 and/or friction or inertia welded at 92 to retainer 70.

Figure 6:
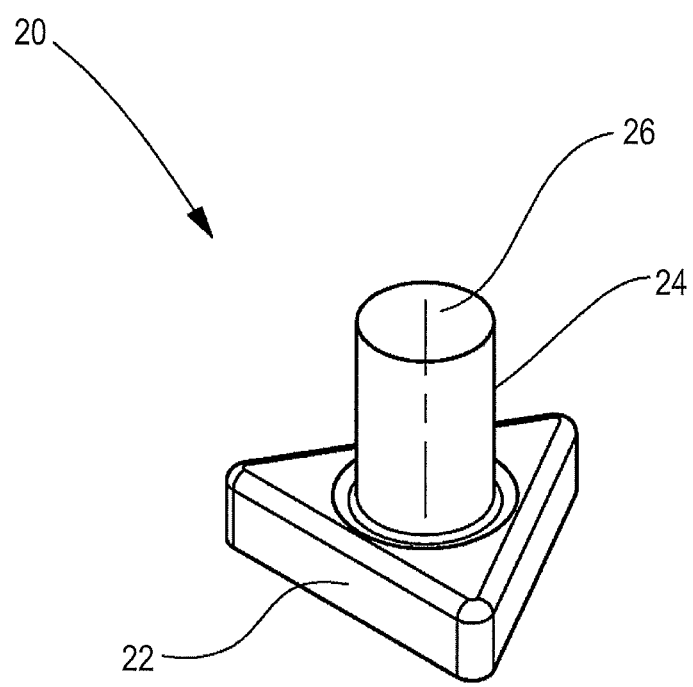
FIG. 6 is an isometric view of the retaining pin component of the valve assembly embodiment illustrated in FIGS. 1-3.

FIG. 6 is an isometric view of an embodiment of the retaining pin 20 component of the illustrated embodiment of valve assembly 10. In the embodiment illustrated, retaining pin 20 has a triangular shaped base 22. Referring back to FIG. 4, it is seen that a substantially triangular head 22 of retaining pin 20 provides an increased contact surface area to better secure the generally triangular configuration of guide 30 into valve assembly 10.

A pin shaft 24 extends upwards from the center of base 22. An end face 26 is formed on the end of pin shaft 24 opposite to base 22. In the disclosed assembly, retaining pin 20 may be made of low carbon steel, such as 1018 or other suitable material. In this embodiment, heat treatment of retaining pin 20 is advantageously not required.

Figure 7:
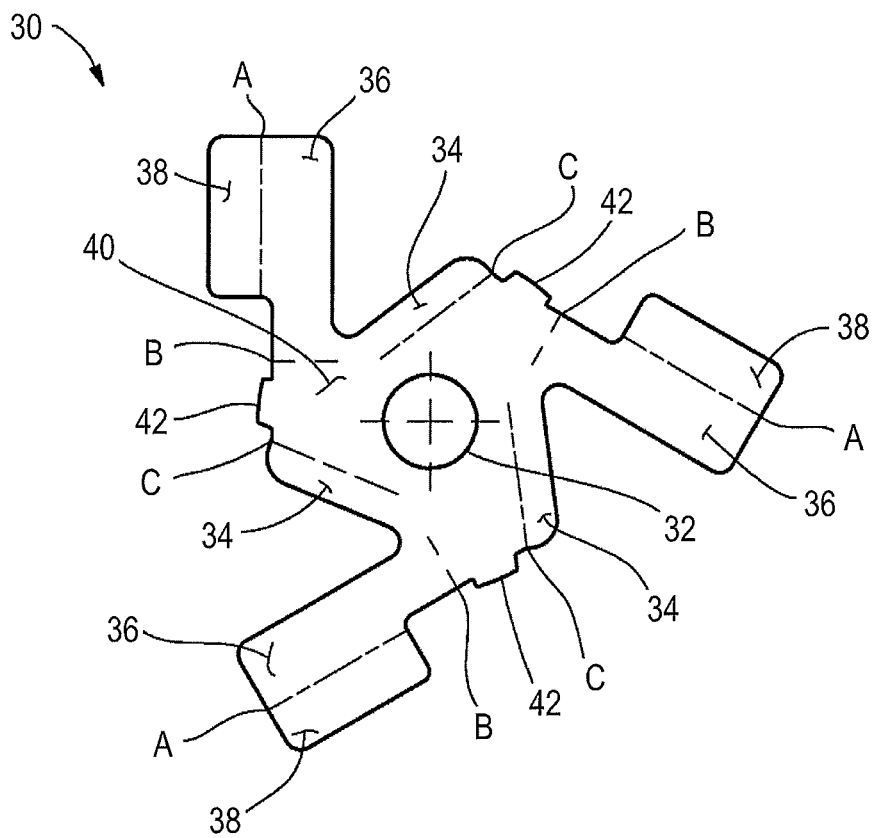
FIG. 7 is a bottom view of an in-process guide component of the valve assembly embodiment illustrated in FIGS. 1-3.

FIG. 7 is a bottom view of an embodiment of guide 30 of valve assembly 10, shown in process. Among the several unique features of this embodiment is the inclusion of a flat stock guide component 30, shown here after stamping and prior to forming. Optionally, guide 30 may be formed by laser cutting. Guide 30 has an aperture 32 for positioning guide 30 over retaining pin 20. At this stage, guide 30 has a substantially flat central portion 40.

Referring to FIG. 7, dashed lines A, B and C illustrate nine separate folds of the flat stock of guide 30 that are required to create the final part illustrated in this embodiment. Folds 'A' create three footers 38. Folds 'B' create three legs 36, which include footers 38. Folds 'C' create three stabilizers 34. Of these components, only footers 38 may come into contact with valve port 100 (FIG. 4). Footers 38 may have hardfacing or other treatment applied to enhance their wear resistance without the need to heat treat the entire valve assembly.

Figure 8:
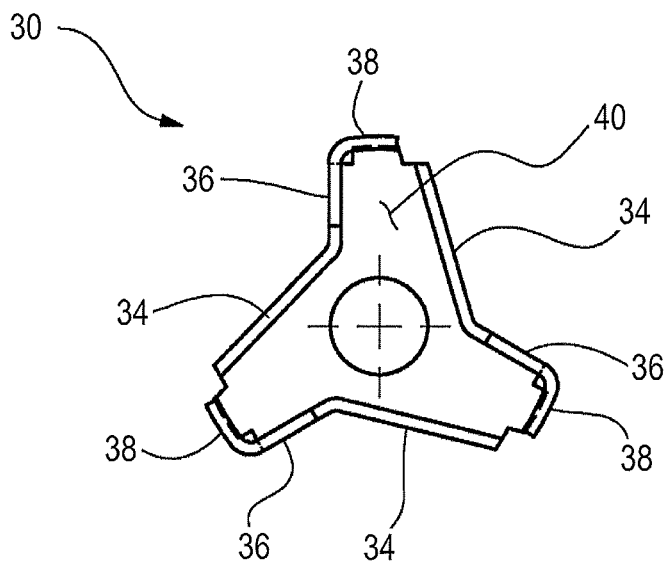
FIG. 8 is a bottom view of the guide component of FIG. 7 after a forming step.
Figure 9:
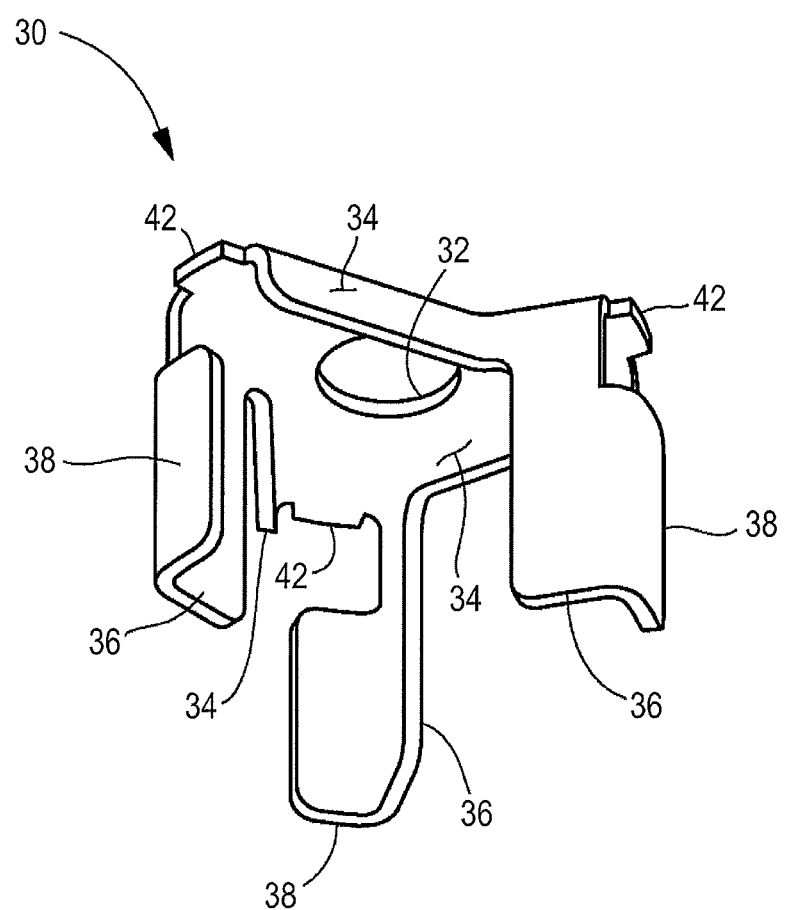
FIG. 9 is an isometric view of the guide component of FIG. 8.

FIG. 8 is a bottom view of guide 30 of FIG. 7 after a forming step which includes the bending of folds A, B and C. FIG. 9 is an isometric view of the embodiment of guide 30 illustrated in FIG. 8. As best seen in FIG. 9, folds A have created footers 38 which extend substantially perpendicular, one each, in relation to legs 36. Folds B have created legs 36 which extend downward and substantially perpendicular in relation to top surface 34. Folds C have created stabilizers 34, which also extend downward and substantially perpendicular in relation to top surface 40.

In a preferred embodiment illustrated in FIGS. 8 and 9, the folds at B and C can be advantageously formed such that contiguous stabilizers 34 and legs 36 provide a singular substantially continuous structure. In this manner, stabilizers 34 and legs 36 provide mutual support and strengthen the structure of guide 30.

As best seen in FIGS. 7 and 9, a plurality of tabs 42 is provided that extends outward from central portion 40. Tabs 42 may be used to provide locating structures for accurate bending of folds A, B, and C. Referring back to FIG. 4, tabs 42 further provide triangulated positioning of guide 30 inside a recess 57 (see FIG. 10) of valve 50 of valve assembly 10. In this manner, a more accurate concentric alignment of the guide 30 and footers 38 can be achieved with regard to the center of valve 50. It is understood that such concentricity between these structures is critical to the life and performance of valve assembly 10. It is further understood that direct three-point alignment between valve 50 and guide 30 is superior to the inevitable accumulated tolerances realized in aligning all components on a third body, such as retaining pin 20.

As described, the unique configuration and process for manufacturing guide 30 may be advantageously made of an inexpensive low carbon, or low carbon alloy sheet steel, or other affordable material. Guide 30 may also be made of high carbon steel. It may only be necessary to heat treat or otherwise surface treat legs 36 of guide 30. Legs 36 and/or guide 30 may be readily heat treated by various means, including, but not limited to, induction or laser heat treating, spot welding, or conventional hardfacing.

Figure 10:
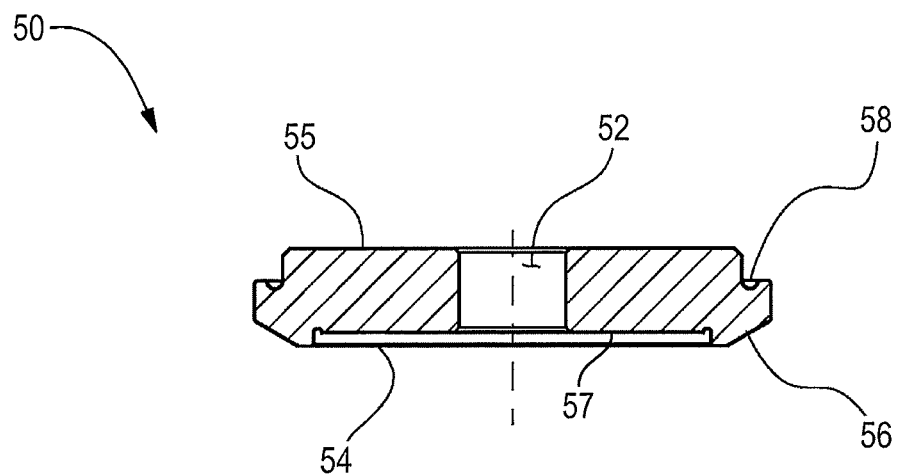
FIG. 10 is a cross-sectional side view of the valve component of the valve assembly embodiment illustrated in FIGS. 1-3.

FIG. 10 is a cross-sectional side view of an embodiment of valve 50 of valve assembly 10. In this embodiment, valve 50 has an aperture 52 for location of valve 50 onto retaining pin 20. Valve 50 has a recess 57 on bottom surface 54 and an opposite top surface 55 connected at their centers by aperture 52. Valve 50 has a valve face 56. A tongue and groove 58 is provided between valve face 56 and top surface 55. Recess 57 of bottom surface 54 engages central portion 40 of guide 30 when assembled on retaining pin 20. Tabs 42 of guide 30 position guide 30 centrally by engaging the inner circumference of recessed surface 54.

Valve face 56 is commonly angled between 30 and 45 degrees relative to recessed bottom surface 54. Valve 50 may be made of suitable steel such as 4150 or other relatively hard steel. In one embodiment, valve 50 may be hardened by induction hardening or other appropriate heat treating method. Advantageously, valve 50 may be heat treated without the requirement to heat treat the entire valve assembly 10.

Figure 11:
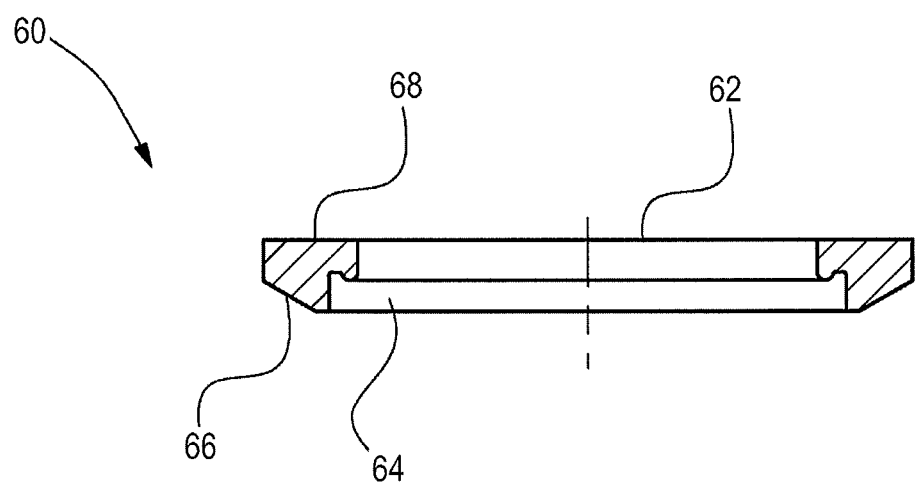
FIG. 11 is a cross-sectional side view of the insert component of the valve assembly embodiment illustrated in FIGS. 1-3.

FIG. 11 is a cross-sectional side view of an embodiment of insert 60 of valve assembly 10. Insert 60 has an aperture 62. Insert 60 has a top surface 68 and a face 66. A tongue and groove 64 is provided between aperture 62 and face 66. Tongue and groove 64 is configured for complementary engagement with tongue and groove 58 of valve 50. Aperture 62 fits over valve 50 to engage insert 60 with valve 50.

Insert face 66 is commonly angled between 30 and 45 degrees relative to insert top surface 68, such that when insert 60 is located onto valve 50, insert face 66 and valve face 56 form a semi-continuous surface for engaging the valve seat portion of valve port 100, as best seen in FIG. 5.

Insert 60 may be made of urethane or other suitable material that is used to manufacture inserts for conventional valve designs. Insert 60 operates to provide a seal with the valve seat of valve port 100 when debris common to operations such as fracking prevents a metal-to-metal seal. In a preferred embodiment, insert 60 is compressively fit over valve 50, thereby enhancing the wear performance of the elastomeric insert 60.

Figure 12:
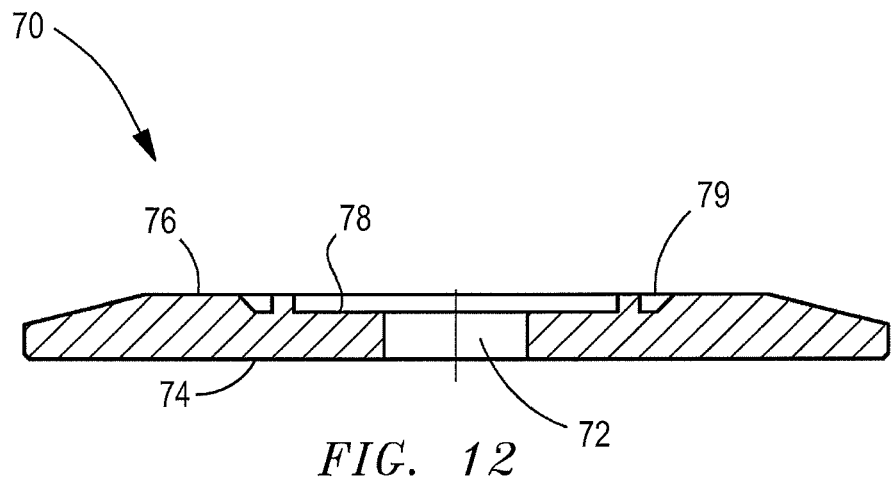
FIG. 12 is a cross-sectional side view of the retainer component of the valve assembly embodiment illustrated in FIGS. 1-3.

FIG. 12 is a cross-sectional side view of an embodiment of retainer 70 of valve assembly 10. Retainer 70 has an aperture 72 for location onto retaining pin 20. Retainer 70 has a bottom surface 74 and a top surface 76. Bottom surface 74 engages top surface 62 of insert 60 when assembled on retaining pin 20. Retainer 70 may be advantageously made of low carbon steel such as 1020 steel or other suitable material. In the embodiment illustrated, heat treatment is optional, and not required.

In the embodiment illustrated, a first circular recess 78 is located in top surface 76. In an optional embodiment, a second circular recess 79 is located on top surface 76.

Figure 13:
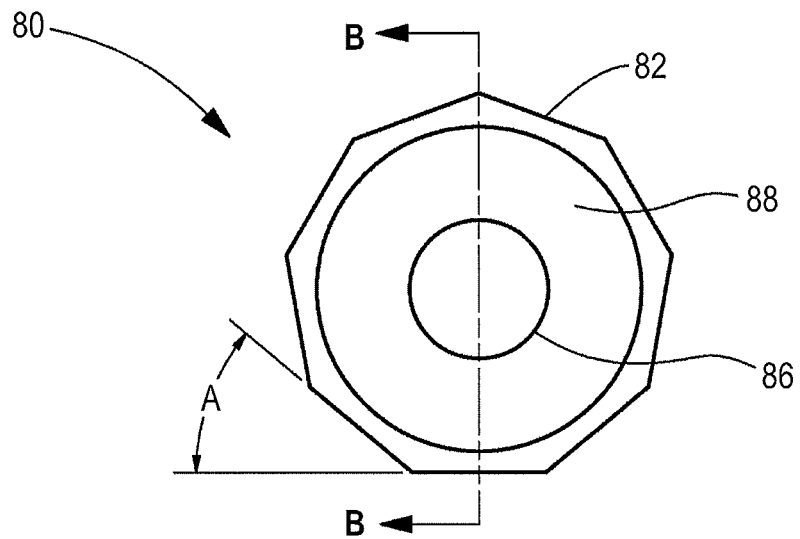
FIG. 13 is a bottom view of the retainer cap of the valve assembly embodiment illustrated in FIGS. 1-3.
Figure 14:
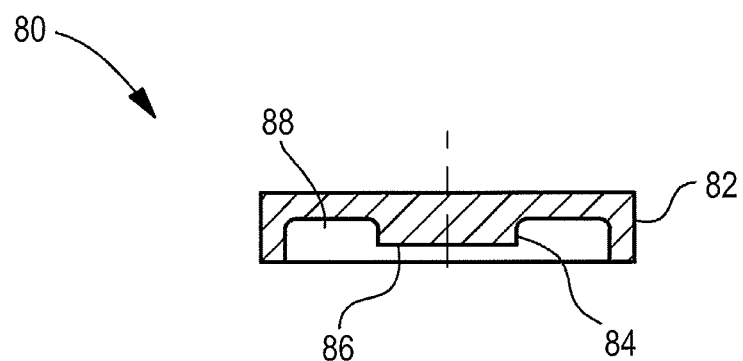
FIG. 14 is a sectional view of the retainer cap of the valve assembly embodiment illustrated in FIGS. 1-3 sectioned at B-B as illustrated in FIG. 13.

FIG. 13 is a bottom view of an embodiment of retainer cap 80 of the valve assembly 10 embodiment illustrated in FIGS. 1-3. FIG. 14 is a sectional view of the embodiment of retainer cap 80 sectioned at B-B as illustrated in FIG. 13. Referring to FIGS. 13 and 14, retainer cap 80 has a head portion 82 on top of a stem portion 84. A substantially flat base 86 is located at the end of stem 84. A flash trap 88 is formed on the underside of head portion 82, adjacent stem 84, to facilitate welding.

In the embodiment illustrated, as best seen in FIG. 13, the exterior of head portion 82 is configured to have nine symmetrical sides. The nonagon exterior perimeter generates contiguous sides having an angle 'A' of about 40 degrees between them. Other shapes may be used. Retainer cap 80 may be made of a low alloy, or low carbon steel. Heat treatment of retainer cap 80 is optional, and is not required.

In the assembly of valve assembly 10, guide 30, valve 50, insert 60, and retainer 70 are stacked on pin shaft 24 of retaining pin 20. Force is applied between head 22 and retainer cap 80 to compress the assembly. Base 86 of retainer cap 80 is welded to end face 26 of retaining pin 20. This weld can be a solid state inertia or friction weld or any appropriate meld fusion technique. In another embodiment illustrated, cap 80 may optionally be welded directly to retainer 70 on top surface 76 between first recess 78 and second recess 79.

FIGS. 15-27 are directed to the alternatives in embodiment and improvements to the disclosed embodiments of FIGS. 1-14.

Figure 15:
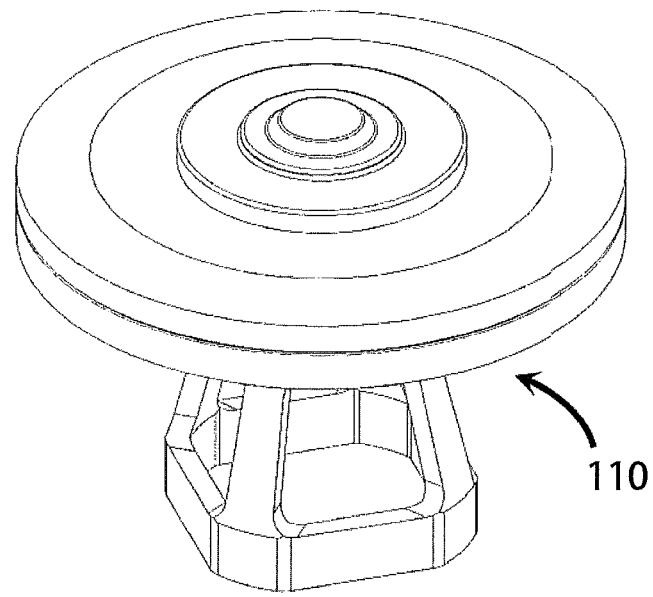
FIG. 15 is an isometric view of the valve assembly shown in accordance with certain embodiments of the disclosed design, as viewed from the top of the valve assembly.
Figure 16:
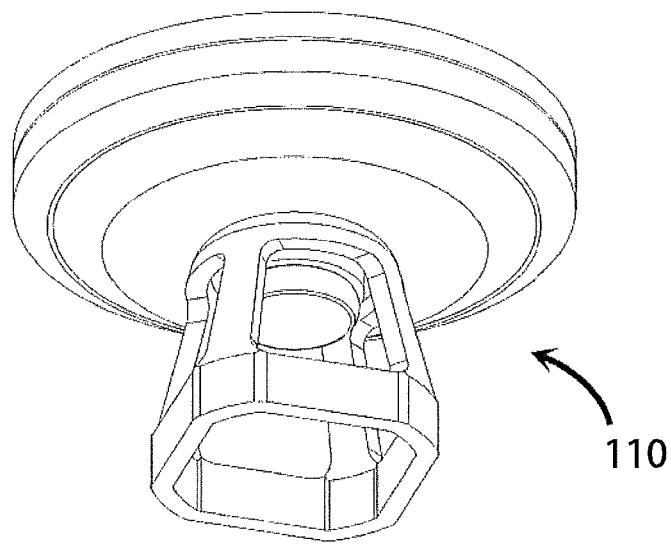
FIG. 16 is an isometric view of the valve assembly of FIG. 15 as viewed from the bottom of the valve assembly.

FIG. 15 is an isometric view of an embodiment of a valve assembly 110 of the disclosed design as viewed generally from the top of valve assembly 110. FIG. 16 is an isometric view of this embodiment of valve assembly 110 as viewed generally from the bottom of valve assembly 110.

Figure 17:
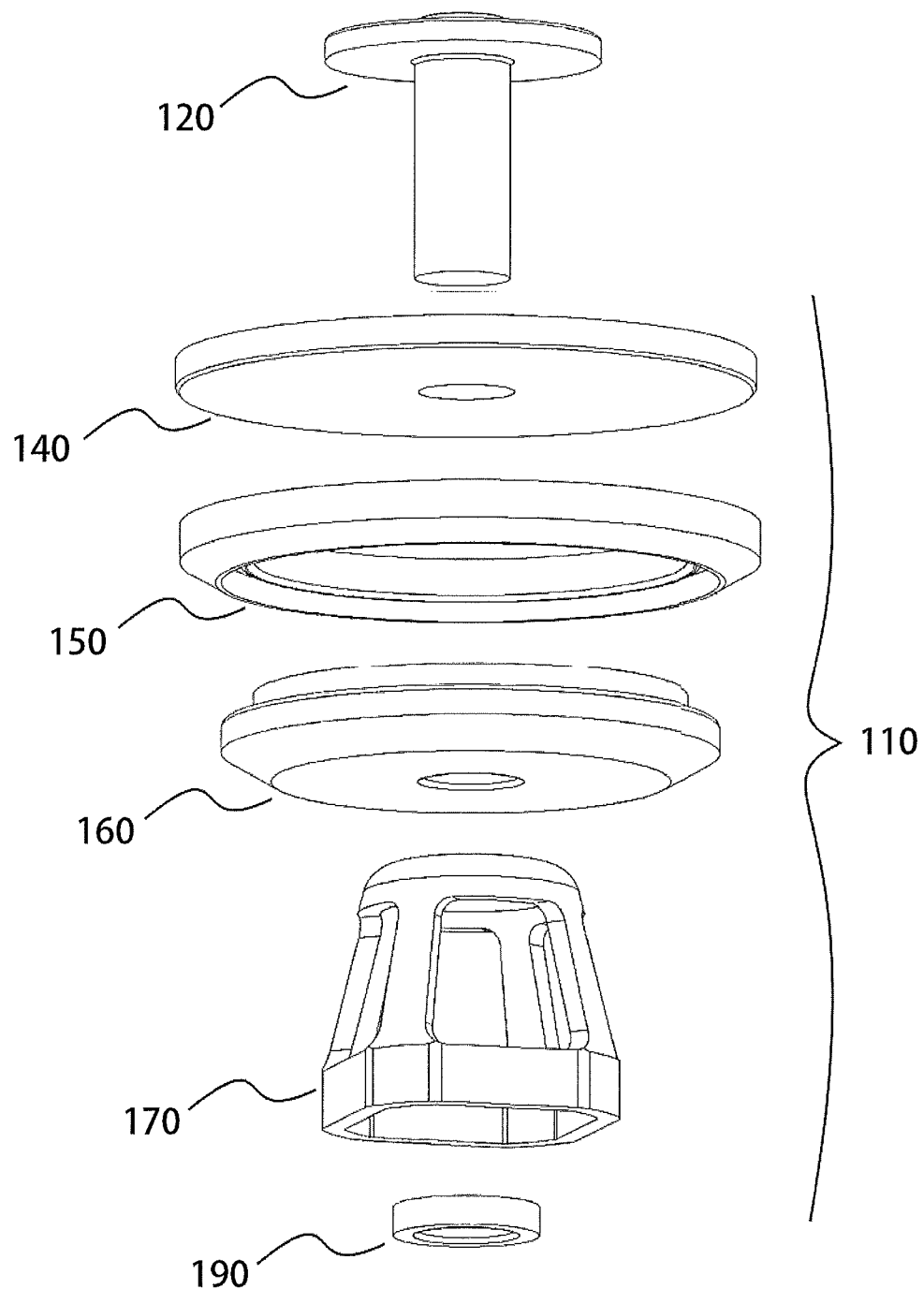
FIG. 17 is an isometric exploded view of the valve assembly of FIGS. 15-16 shown in accordance with certain embodiments of the disclosed design.

FIG. 17 is an isometric exploded view of an embodiment of valve assembly 110, illustrating the multiple components of this embodiment. Valve assembly 110 comprises a retaining pin 120. An insert retainer 140 is positioned on retaining pin 120. In an alternative embodiment, not illustrated, retaining pin 120 and insert retainer 140 are a unitary component. An insert 150 is positioned on retaining pin 120 beneath insert retainer 140. A valve 160 is positioned on retaining pin 120 beneath insert 150. Valve 160 is positioned in engagement with insert 150. A guide 170 is located on retaining pin 120 beneath valve 160. A spacer 190 may optionally be located on retaining pin 120 beneath guide 170.

Figure 18:
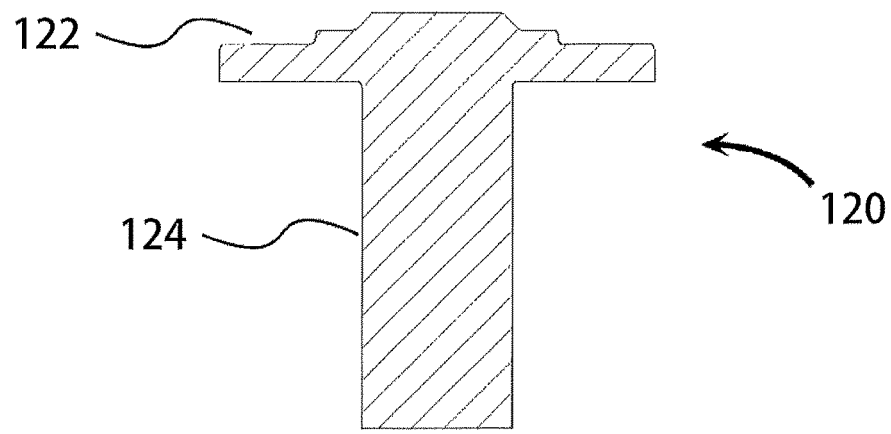
FIG. 18 is a cross-sectional view of the retaining pin component of the valve assembly embodiment illustrated in FIGS. 15-17.

FIG. 18 is a cross-sectional view of retaining pin 120 of the embodiment of valve assembly 110 illustrated in FIGS. 15-17. Retaining pin 120 has a cap 122 and a shaft 124 extending from cap 122. An expanded end face 126 (see FIG. 27) is formed on the end of pin shaft 124 opposite to cap 122 to complete assembly of valve assembly 110. This process is completed by upset forge or similar method. In the disclosed assembly, retaining pin 120 may be made of low carbon steel, such as 1018 or other suitable material. In this embodiment, heat treatment of retaining pin 120 is advantageously not required.

Figure 19:
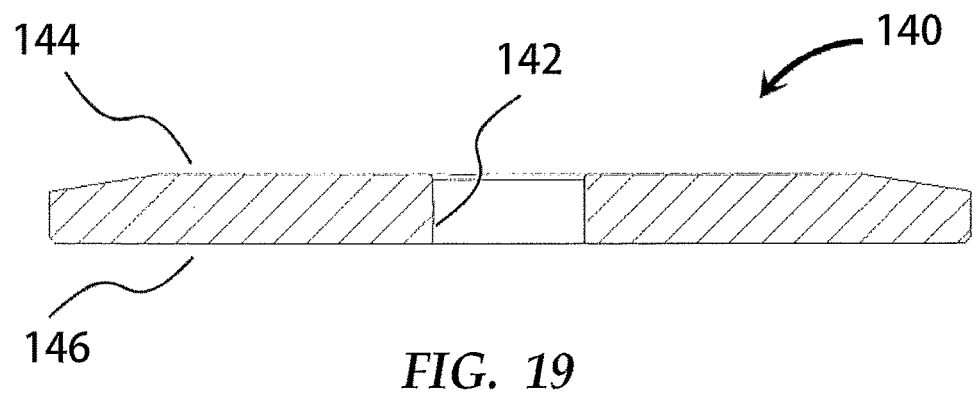
FIG. 19 is a cross-sectional side view of the insert retainer component of the valve assembly embodiment illustrated in FIGS. 15-17.

FIG. 19 is a cross-sectional side view of insert retainer 140 component of the embodiment of valve assembly 110 illustrated in FIGS. 15-17. Retainer 140 has an aperture 142 for location onto shaft 124 of retaining pin 120. Retainer 140 has a top surface 144 and a bottom surface 146. Bottom surface 146 engages a top surface 154 of insert 150 when assembled on retaining pin 120. Retainer 140 may be advantageously made of low carbon steel such as 1020 steel or other suitable material. In the embodiment illustrated, heat treatment is optional, and not required.

Figure 20:
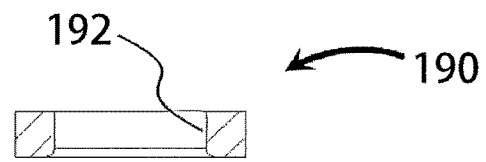
FIG. 20 is a cross-sectional side view of the spacer component of the valve assembly embodiment illustrated in FIGS. 15-17.
Figure 27:
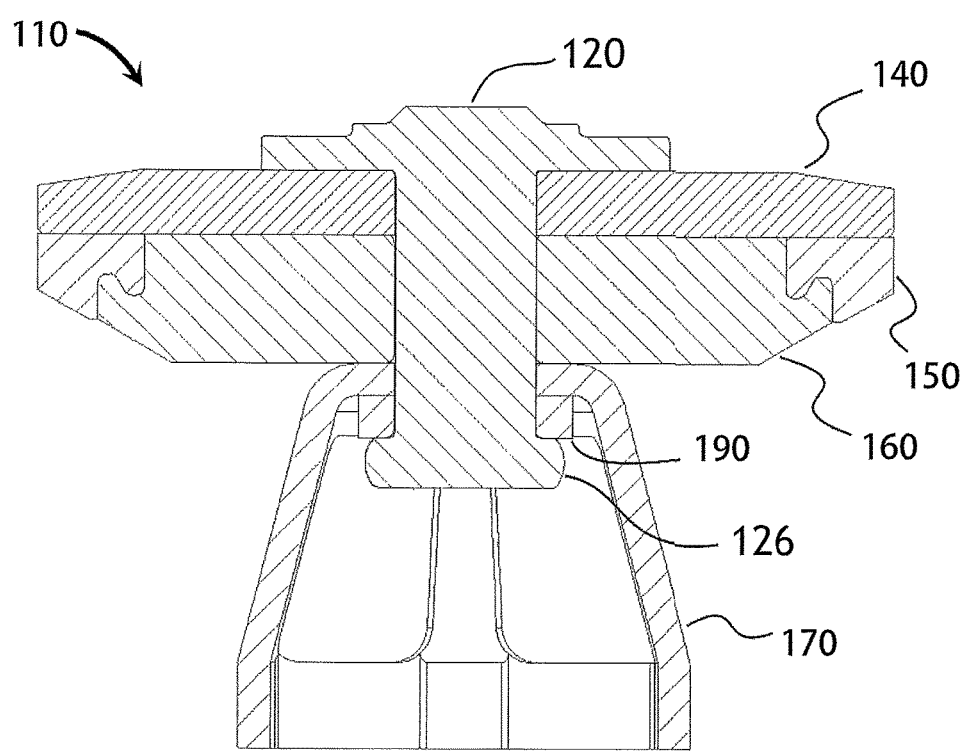
FIG. 27 is a cross-sectional view of the valve assembly embodiment of FIG. 26, illustrating the completed valve assembly, with compressed expansion of the bottom of the retaining pin.

FIG. 20 is a cross-sectional side view of spacer 190 component of the embodiment of valve assembly 110 illustrated in FIGS. 15-17. Spacer 190 may be located on shaft 124 of retaining pin 120 as best seen in FIG. 27. In this position, and unique to the construction and assembly of the presently disclosed valve assembly 110, an expanded end face 126 (see FIG. 27) is formed on the end of pin shaft 124 to complete assembly of valve assembly 110 and hold the several components together in compression. This process may be completed by upset forge or similar method. In this process, spacer 190 absorbs and distributes the impact forces endured by retaining pin 120 when expanded end face 126 is formed, thus protecting the integrity and geometry of guide 170.

Figure 21:
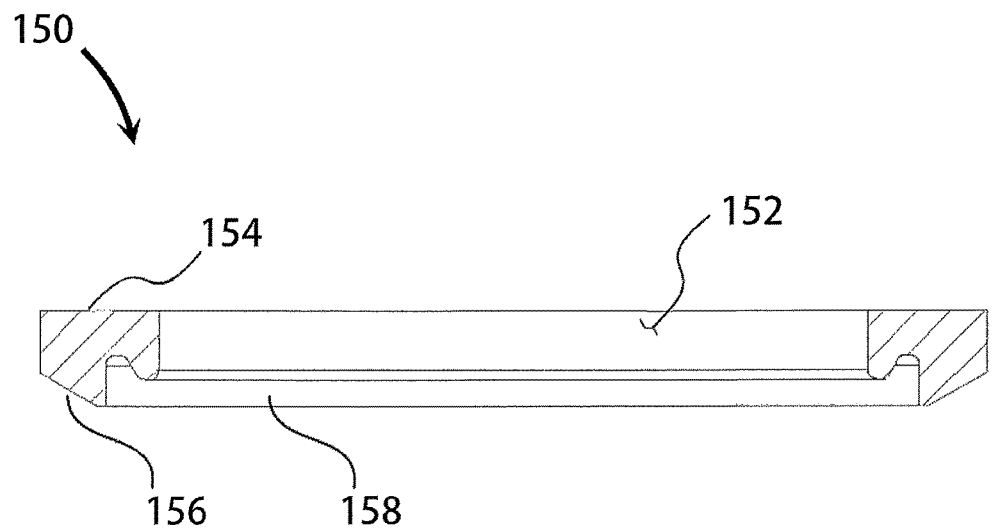
FIG. 21 is a cross-sectional side view of the insert component of the valve assembly embodiment illustrated in FIGS. 15-17.

FIG. 21 is a cross-sectional side view of insert 150 of the embodiment of valve assembly 110 illustrated in FIGS. 15-17. Insert 150 has an aperture 152. Insert 150 has a top surface 154 and a face 156. A tongue and groove 158 is provided between aperture 152 and face 156. Tongue and groove 158 is configured for complementary engagement with a tongue and groove 168 of valve 160 (see FIG. 7). Aperture 152 fits over valve 160 to engage insert 150 with valve 160.

Insert face 156 is commonly angled between 30 and 45 degrees relative to insert top surface 154, such that when insert 150 is located onto valve 160, insert face 156 and valve face 166 form a semi-continuous surface for engaging the valve seat portion of valve port 100 (not shown for this embodiment, however, see FIG. 5).

Insert 150 may be made of urethane or other suitable material that is used to manufacture inserts for conventional valve designs. Insert 150 operates to provide a seal with the valve seat portion of valve port 100 when debris common to operations such as fracking prevents a metal-to-metal seal. In this embodiment, insert 150 is compressively fit over valve 160, thereby enhancing the wear performance of the elastomeric insert 150.

Figure 22:
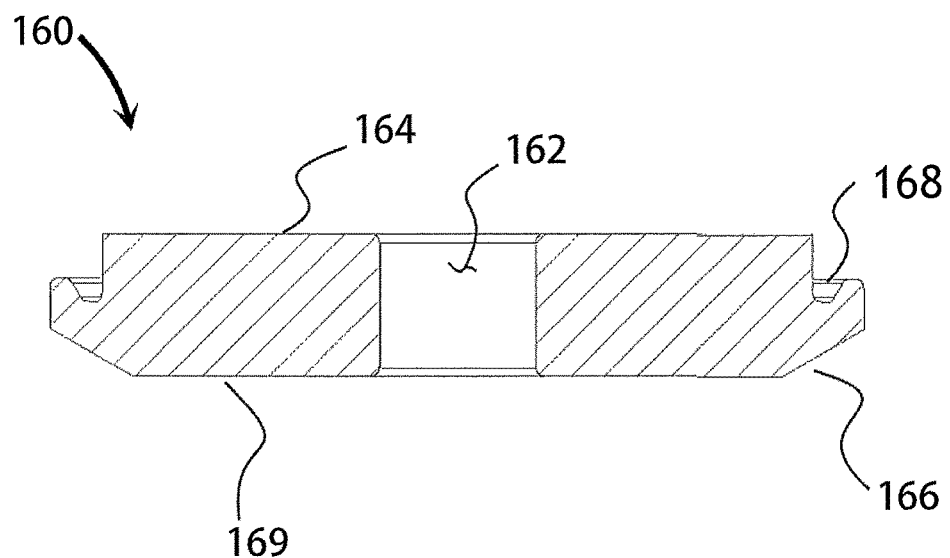
FIG. 22 is a cross-sectional side view of the valve component of the valve assembly embodiment illustrated in FIGS. 15-17.

FIG. 22 is a cross-sectional side view of valve component 160 of the embodiment of valve assembly 110 illustrated in FIGS. 15-17. In this embodiment, valve 160 has an aperture 162 for location of valve 160 onto retaining pin 120. Valve 160 has a top surface 164 for engagement with retainer 140 on assembly of valve assembly 110.

Valve 160 has a valve face 166. Valve 160 has a tongue and groove 168 provided between top surface 164 and valve face 166. Tongue and groove 168 is configured for complementary engagement with a tongue and groove 158 of insert 150, as best seen in FIG. 27.

Valve 160 has a bottom surface 169 on its side opposite to top surface 164. Valve face 166 is commonly angled between 30 and 45 degrees relative to bottom surface 169. Valve 160 may be made of suitable steel such as 4150 or other relatively hard steel. In one embodiment, valve 160 may be hardened by induction hardening or other appropriate heat treating method. Quenching and tempering may provide desirable wear hardness to valve face 166. Advantageously, valve 160 may be heat treated without the requirement to heat treat the entire valve assembly 110.

Figure 23:
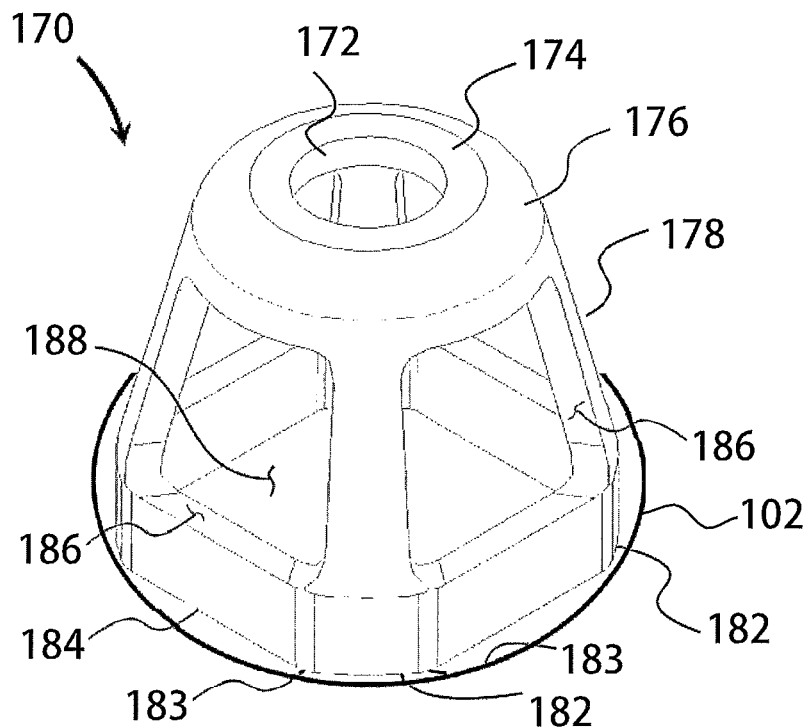
FIG. 23 is an isometric view of the guide component of the valve assembly embodiment illustrated in FIGS. 15-17.

FIG. 23 is an isometric view of a guide 170 component of the embodiment of valve assembly 110 illustrated in FIGS. 15-17. Guide 170 has a top 174 with a central aperture 172 for locating guide 170 on shaft 124 of retaining pin 120. An optional transition 176 extends downward from top 174. Transition 176 may be a spherical segment (shown) or a conical segment, or similar transitional geometry. Four legs 178 extend downward from transition 176. Transition 176 provides strength to guide 170 as between the connection of legs 178 to top 174.

Figure 24:
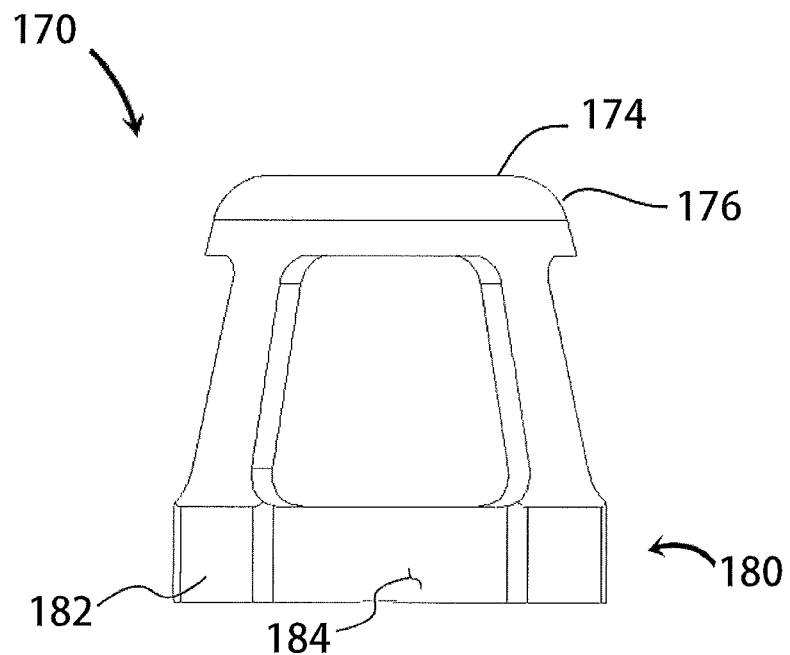
FIG. 24 is a side view of the guide component of FIG. 22.

FIG. 24 is a side view of guide 170 of FIG. 23. Referring to FIGS. 23 and 24, a continuous base 180 is provided to connect each of legs 178. In the embodiment illustrated, base 180 has facets 182 formed at the bottom of each leg 178. A beam 184 extends between each facet 182. Alternating between facets 182 and beams 184, base 180 is a continuous structure connecting from which legs 178 extend.

In the embodiment illustrated, base 180 is comprised of two pairs of opposing parallel beams 184, oriented perpendicular to each other, to form a substantially square base 180. Facets 182 may be chamfered edges between beams 184, or radii. Facets 182 position guide 170 thus and valve assembly 110 in a centered position inside a pump valve port 100 (represented by circle 102 in FIG. 23) with at least four curves of contact when facets 182 are circular sections and at least eight points of contact (edges 183) when facets 182 are not circular sections.

As seen in FIG. 23, a substantially square and symmetrical flow portal 188 is formed inside base 180 to permit high and even flow. Also seen are large windows 186, formed between legs 178. Windows 186 and flow portal 188 provide highly symmetrical flow paths through valve assembly 110, which, combined with the distributed guide contact described further below, extend the life of valve assembly 110.

In the embodiment illustrated, an edge 183 may be formed between each facet 182 and beam 184. Edges 183 (FIG. 23) provide eight points of contact for guide 170 to distribute centralizing forces within valve port 100 (represented by circle 102 in FIG. 23). In the embodiment illustrated, guide 170 has a generally truncated pyramid shape. Guide 170 may be advantageously and economically created by stamping and forming.

In this manner, a more accurate concentric alignment of valve assembly 110 can be achieved as to the centerline of a pump cylinder in which valve assembly 110 is disposed. It is understood that such concentricity is essential to the life and performance of valve assembly 110. It is further understood that direct eight-point guide 170 alignment between valve assembly 110 and the cylinder in which it is disposed is superior to two, three, or four point contact with regard to the life of valve assembly 110.

Figure 25:
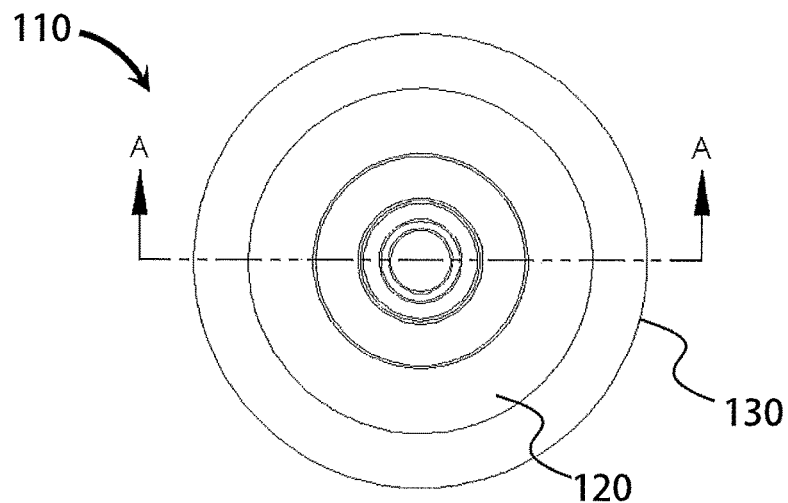
FIG. 25 is a top view of the valve assembly embodiment of FIGS. 15-17, illustrating a section line A-A through this view of the valve assembly.

FIG. 25 is a top view of an embodiment of valve assembly 110, illustrating a section line A-A through this view of valve assembly 110.

Figure 26:
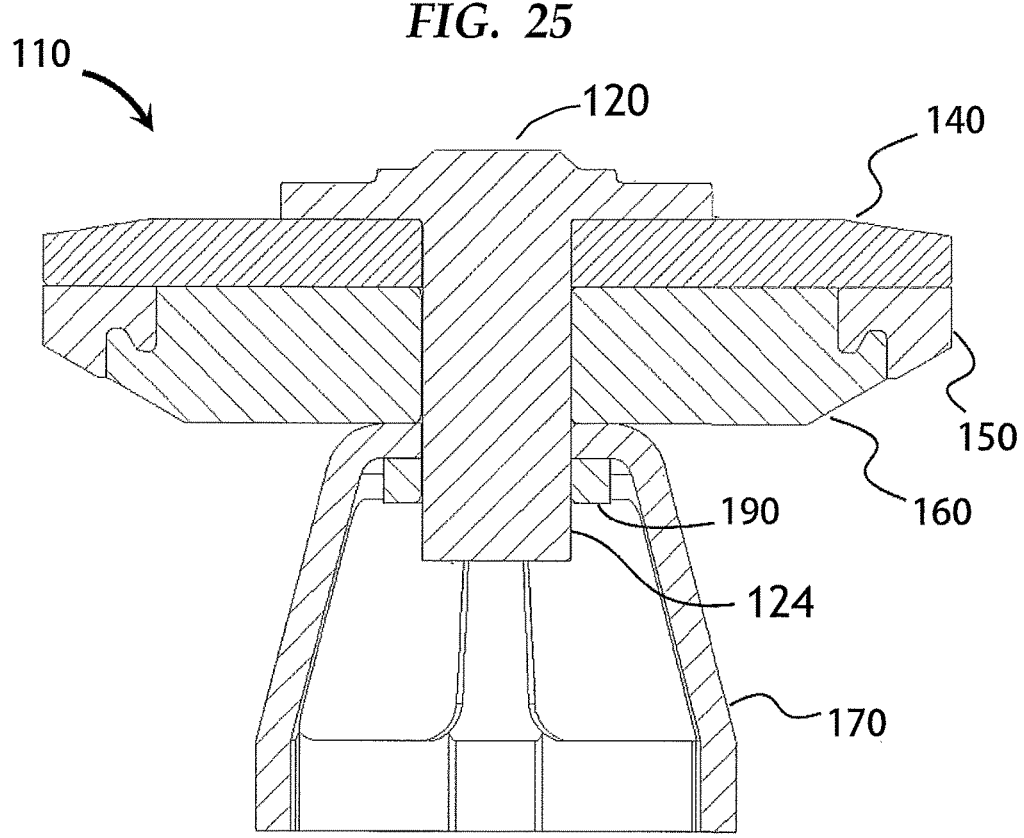
FIG. 26 is a cross-sectional view of the valve assembly embodiment of FIGS. 15-17 sectioned at A-A as illustrated in FIG. 18, illustrating the valve assembly in process, before compressed expansion of the bottom of the retaining pin.

FIG. 26 is a cross-sectional view of the embodiment of valve assembly 110 of FIGS. 15-17 sectioned at A-A as illustrated in FIG. 25, illustrating valve assembly 110 during the assembly process, and before compressed expansion of the bottom of shaft 124 of retaining pin 120.

FIG. 27 is a cross-sectional view of the embodiment of valve assembly 110 of FIG. 25, illustrating completion of the assembly, with formation of expanded portion 126 on the bottom of shaft 124 of retaining pin 120.

As described, the unique configuration and process for manufacturing guide 170 may be advantageously made of an inexpensive low carbon, or low carbon alloy sheet steel, or other affordable material. Guide 170 may also be made of high carbon steel. It may only be necessary to heat treat or otherwise surface treat guide 170. Guide 170 may be readily heat treated by various means, including, but not limited to, induction or laser heat treating, spot welding, or conventional hardfacing.

In the assembly of valve assembly 110, retainer 140, insert 150, valve 160, guide 170, and spacer 190 are stacked on shaft 124 of retaining pin 120. Force is applied between cap 122 and the heated end of shaft 124 to compress the assembly and form expanded portion 126 on the bottom of shaft 124 of retaining pin 120 to hold valve assembly 110 together, and in compression.

Expanded end 126 can be advantageously formed by hot pressing technology. This process has been demonstrated in test pieces as being a highly economical and reliable means for assembly of valve assembly 110.

Having thus described the disclosed design by reference to certain of its embodiments, it is noted that the embodiments disclosed are illustrative rather than limiting in nature and that a wide range of variations, modifications, changes, and substitutions are contemplated in the foregoing disclosure and, in some instances, some features of the disclosed design may be employed without a corresponding use of the other features. Many such variations and modifications may be considered desirable by those skilled in the art based upon a review of the foregoing description of preferred embodi-

The invention claimed is:

1. A valve assembly, comprising:
   a retaining pin having a retaining cap on its upper end;
   a retainer centered on the retaining pin beneath the retaining cap;
   a valve centered on the retaining pin beneath the retainer;
   an insert centered on the valve and beneath the retainer;
   a guide having a generally truncated pyramid shape, and having a central portion on its upper end;
   the guide central portion centered on the retaining pin beneath the valve; and,
   the retaining pin having an expanded end face formed on its lower end to secure the valve assembly together; and,
   a spacer located between the guide central portion and the expanded end face of the retaining pin.

2. The valve assembly of claim 1, further comprising:
   the guide being generally bell-shaped.

3. The valve assembly of claim 1, further comprising:
   the guide having four legs interconnected by a generally square base.

4. The valve assembly of claim 3, further comprising:
   a window opening formed between each of the legs.

5. The valve assembly of claim 1, further comprising:
   the guide having eight perimeter extents.

6. The valve assembly of claim 1, the guide further comprising:
   a circular top;
   a transition extending downward from the top;
   a continuous base; and,
   four legs extending downward from the upper portion to the base.

7. The valve assembly of claim 6, further comprising:
   the guide having eight perimeter extents.

8. The valve assembly of claim 1, further comprising:
   the expanded end face formed on the retaining pin by hot pressing the lower end of the pin.

9. The valve assembly of claim 7, further comprising:
   a window opening formed between each of the legs; and, the windows are substantially square.

10. The valve assembly of claim 7, further comprising:
    the continuous base comprised of two pairs of opposing beams.

11. The valve assembly of claim 6, further comprising:
    the transition being a spherical segment.

12. The valve assembly of claim 6, further comprising:
    the transition being a conical segment.

13. The valve assembly of claim 10, further comprising:
    the continuous base formed of alternating facets and beams to form a continuous structure from which the legs extend to the top.

14. The valve assembly of claim 1, further comprising:
    the retaining pin, guide, insert retainer, and retainer cap, being comprised of steel; and,
    the valve being comprised of a steel that is higher in carbon content than that of the retaining pin, guide, insert retainer, and retainer cap.

15. A valve assembly comprising:
    a retaining pin having a retaining cap on its upper end;
    a retainer centered on the retaining pin beneath the retaining cap;
    a valve centered on the retaining pin beneath the insert;
    an insert centered on the valve and beneath the retainer;
    a guide having a generally truncated pyramid shape, and having a central portion on its upper end;
    the guide central portion centered on the retaining pin beneath the valve;
    the retaining pin having an expanded end face formed on its lower end to secure the valve assembly together;
    a circular top;
    a transition extending downward from the top;
    a continuous base;
    four legs extending downward from the upper portion to the base; and,
    a facet at the bottom of each leg, forming a chamfered edge between sequential beams.

16. The valve assembly of claim 15, further comprising:
    the guide having four legs interconnected by a generally square base.

17. The valve assembly of claim 15, further comprising:
    a window opening formed between each of the legs.

18. The valve assembly of claim 15, further comprising:
    the guide having eight perimeter extents.

19. The valve assembly of claim 15, further comprising:
    the continuous base formed of alternating facets and beams to form a continuous structure from which the legs extend to the top.

* * * * *